United States Patent [19]

Madau

[11] Patent Number: 5,241,295
[45] Date of Patent: Aug. 31, 1993

[54] MULTIPLE INPUT WARNING SYSTEM FOR A MOTOR VEHICLE

[75] Inventor: Adrian Madau, Canton, Mich.
[73] Assignee: Ford Motor Company, Dearborn, Mich.
[21] Appl. No.: 812,921
[22] Filed: Dec. 24, 1991
[51] Int. Cl.$^5$ .............. B60Q 1/00; G09F 9/00
[52] U.S. Cl. ................ 340/461; 340/459; 340/525
[58] Field of Search ............... 340/461, 462, 458, 459, 340/641, 642, 525, 517, 521

[56] References Cited

U.S. PATENT DOCUMENTS

| | | |
|---|---|---|
| 3,899,770 | 8/1975 | Slotkowski . |
| 4,234,866 | 11/1980 | Kuroda et al. .............. 340/521 |
| 4,277,772 | 7/1981 | Kastura et al. . |
| 4,287,503 | 9/1981 | Sumida .............. 340/461 |
| 4,497,057 | 1/1985 | Kato et al. .............. 340/461 |
| 4,550,303 | 10/1985 | Steele .............. 340/641 |
| 4,555,694 | 11/1985 | Yanagishima et al. .............. 340/461 |
| 4,644,334 | 2/1987 | Yato et al. .............. 340/461 |

Primary Examiner—Donnie L. Crosland
Attorney, Agent, or Firm—Richard D. Dixon; Roger L. May

[57] ABSTRACT

A monitoring and display system for enunciating warning signals on the vehicle's master display system when the master ignition switch is off. Operational-type signals and warning-type signals are generated by respective sensors throughout the vehicle. A warning controller, responsive to receiving the warning signals and sensing that the ignition switch is off, actuates an alternate path for supplying power to the master display system and controller, which process and display the warning signals under normal processing protocol. However, the warning controller also deactuates the portion of the master display system and controller that normally would display operational signals. In this manner safety related warning signals, and not the normal operating signals, will be displayed to the driver on the master display system of the vehicle even when the ignition switch is off.

19 Claims, 4 Drawing Sheets

MULTIPLE INPUT WARNING SYSTEM FOR A MOTOR VEHICLE

BACKGROUND OF THE INVENTION

1. Field of the Invention

This invention relates to a multiple input warning system for a motor vehicle and, more particularly, to a warning display system that operates with the vehicle ignition off.

2. Prior Art

Special purpose multiple input warning systems are well represented in the prior art. One example of these specialized warning systems include U.S. Pat. No. 3,899,770 issued to Slotkowski and assigned to Ford Motor Company. That invention relates to a system for activating an audible and/or visual warning indicator in response to the vehicle ignition key being placed in a special condition and then the occurrence of a particular vehicle condition or malfunction sensed by one or more of a plurality of input signals and/or condition indicating devices. Another example of a vehicle warning system includes U.S. Pat. No. 4,550,303 issued to Steele and assigned to General Motors Corporation. That invention relates to the use of a latch for maintaining power applied to a failure lamp that is activated in response to the sensing of a vehicle failure, even after the vehicle ignition is switched off. Still another example of a centralized vehicle alarm system is disclosed in U.S. Pat. No. 4,234,866 issued to Kuroda et al and assigned to Nissan Shataico, Ltd.

Other comprehensive motor vehicle diagnostic and monitoring systems are disclosed in U.S. Pat. No. 4,277,772 assigned to General Motors Corporation, and U.S. Pat. No. 4,497,057 assigned to Nippondenso Co. Ltd. Both of these inventions relate to the use of separate computers that are programmed to sense signals emitted by remote sensors indicative of system or component failures. Complex memory systems and diagnostics are used for detecting and/or confirming the failures While each of these warning systems provides a satisfactory solution to the specific problem which they address, none of the above prior art references provides a suitable and cost effective solution to the problem of providing a highly visible and reliable warning system, which is integrated with the vehicle operational display, in a motor vehicle in which the ignition switch is turned to the off position.

It is therefore an object of the present invention to provide a vehicle warning display that is integrated (both functionally and physically) into the master driver information display used for vehicle operational parameters (such as speed, cooling system temperature, electrical system charging, etc.). In order to reduce power consumption and improve display clarity, it is highly desirable to utilize the existing driver information display system for illuminating the key warning indicators, while at the same time blanking or disabling the operational display indicators.

The use and display of safety related vehicle warning indicators (such as left and right turn signals, hazard warning signals, high beam headlight indicators, door ajar indicators, etc.) is often required during or immediately after conditions of heavy electrical system loading. For example, in conditions involving heavy ice and snow storms it is not unusual for the vehicle electrical systems to be fully taxed during the use of windshield wipers, headlights, heater/wind screen defrosters and fans, rear window resistive defrosters, passenger compartment heating fans, radio/audio systems, etc. Under these conditions the driver often finds it necessary to pull off the road for changing tires, waiting for better weather conditions assisting other motorists in distress, etc. During these times the vehicle operator often elects to turn the ignition switch off in order to conserve battery power.

It is important to warn the driver of key vehicle conditions, such as the continued use of turn signals, hazard warning indicators, high beam headlights, door ajar, etc. even when the ignition switch is turned off. Under these circumstances the driver's attention is often diverted to other events occurring in the external environment, and therefor it is desirable to provide a clear and highly visible display of these warnings signals without displaying other extraneous information.

While other prior art inventions have solved this problem through the use of separate indicator warning lights spaced about the dashboard, they often require additional computer control circuitry which increases both cost and electrical power consumption. Furthermore, in modern vehicles the space available for operator information displays has been considerably reduced, thereby mandating a higher degree of integration of information displays.

BRIEF SUMMARY OF THE INVENTION

It is an object of the present invention to provide a system for energizing the master driver information display system within the vehicle for displaying non-operational warning indicators when the vehicle ignition switch is off. In order to improve visibility, to reduce cost and complexity, and to increase display reliability, the operational display indicators within the vehicle instrumentation display are blanked or disabled until the vehicle ignition switch is turned on.

A warning controller system is provided that activates the vehicle master display system and master display controller system in response to receiving a selected, high priority vehicle warning signal Power is provided to both the master controller and display systems, but when the vehicle ignition switch is in the off condition both the operational display and the related aspects of the master display controller are disabled in order to conserve power and to minimize visual display clutter.

In the first preferred embodiment of the present invention the warning indicators are included as an integral part in the master vehicle display (such as a vacuum fluorescent tube). In contrast to other systems that require dedicated special purpose computer and warning display systems, the present invention utilizes the existing display microcontroller system as well as the existing display system for displaying the warning indications. While warning signals such as left turn signal, right turn signal, hazard warning signal, high beam indicator, etc. are displayed with the ignition switch off, other operational display parameters, such as vehicle speed, engine temperature sensors, the odometer, and clock/timer are disabled or blanked, and thus are not displayed.

The various features which characterize the present invention are pointed out with particularity in the claims which are attached to this disclosure. For a better understanding of the invention, its operating advantages and specific objects attained by its use, references will be made to the accompanying drawings and descriptive matter in which the preferred embodiments of the invention are illustrated.

DETAILED DESCRIPTION OF THE PREFERRED EMBODIMENT

Figure 1:
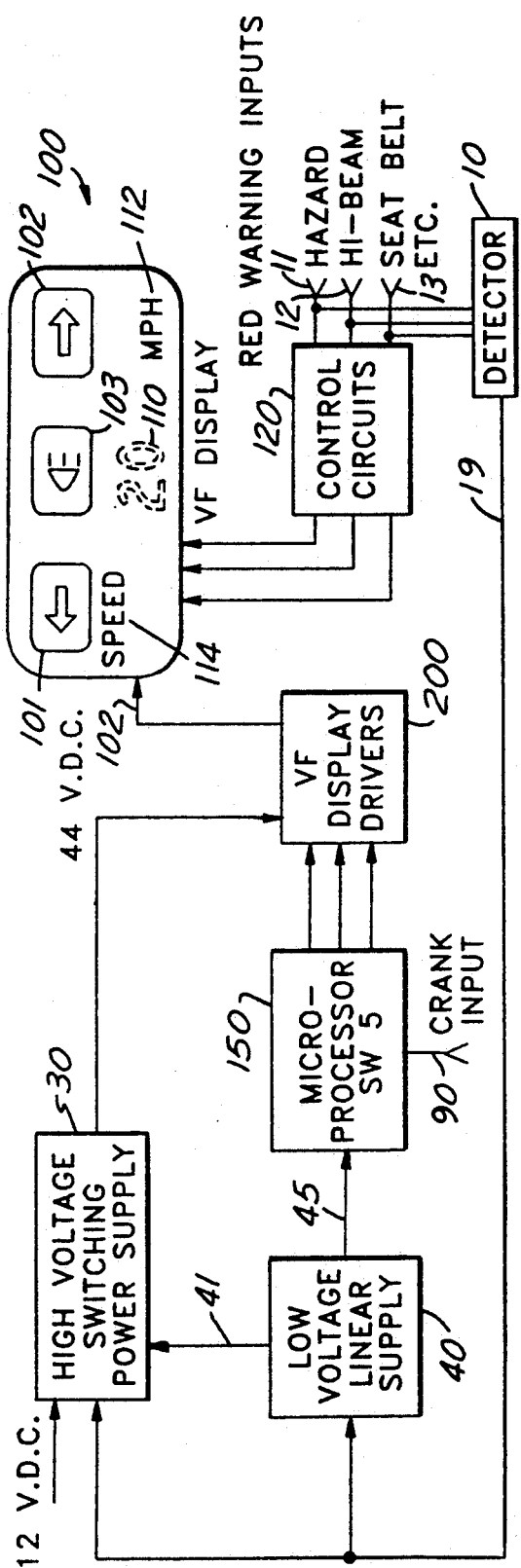
FIG. 1 is a schematic block diagram of a first preferred embodiment of the multiple input warning system in accordance with the present invention.

The first preferred embodiment of the present invention will now be described with reference to FIGS. 1-6. With specific reference to FIG. 1, a schematic block diagram of the multiple input warning system is illustrated as including a plurality of warning input signal receptacles 11, 12, 13 which are coupled to a warning active signal detector 10 which is used to activate the high voltage switching power supply 30. This power supply 30 converts 12 volts dc into a 44 volt dc positive potential which is supplied to the power input 102 of the master driver information display 100 through the VF display driver 200. This display 100 includes a plurality of hazard warning indicators 101, 102, 103, etc. which are normally activated when the master ignition switch is on and the vehicle is running, but which also may be activated in accordance with the present invention when the master ignition switch is in the off position.

The master driver information display 100 also includes several operational indicators, shown generally as 110, 112, 114, etc. These operational indicators receive signals from corresponding operational sensors and normally display information necessary for the driver to safely and intelligently control the vehicle, such as vehicle speed, charging system operation, cooling system operation, odometer, etc. The illumination of these operational indicators is typically not required when the vehicle is not operating, but these displays can be illuminated if the master ignition switch is set to the accessory or standby position. The crank signal line used by the present invention as representative of the position of the master ignition switch is labeled as 90. The crank input signal generally goes high when the ignition switch is in the run position.

Both the warning indicators 101, 102, 103, etc. and the operational indicators 110, 112, 114, etc. are included in the master driver information display 100, which in the preferred embodiment comprises a single vacuum fluorescent (VF) display tube in which each of the indicators is formed from an anode which is illuminated by the incidence of electrons from a cathode controlled by circuitry 120.

The active, warning signal detector 10 includes inputs 11 from warning sensors including the hazard switch, 12 for the high beam headlight active switch, 13 for the seat belt unfastened indicator, etc. These inputs drive the warning active detector 10 such that if any of the inputs are high (active), then the output 19 of the warning active detector 10 also goes high. The output line 19 also is coupled to a low voltage linear supply 40 having a first output 41 that activates the high voltage switching power supply 30 and having a second output 45 that powers and initializes the microprocessor 150. This microprocessor 150 is the controller for the master driver information display system 100 for the vehicle. Multiple outputs from the microprocessor 150 are used to drive the VF display drivers 200, which in turn are coupled to the master driver information display 100 in a manner that will be discussed subsequently.

The control circuits, shown generally as 120 in FIG. 1, will now be illustrated with reference to FIG. 2. While the specific control signals (turn signal, hazard, etc.) may require slight variations in the control circuitry, the various warning inputs will generally utilize circuits similar to that shown in FIG. 2. The circuit includes an input 12 which is coupled to a hard wired switch or sensor, such as the high beam headlight switch for example. This input 12 is coupled through a series diode 122 and resistor 123 that serve to limit and condition the input voltage signal. Resistor 124 and capacitor 125 act to control the bias and to eliminate high frequency noise at the input to transistor 126. The output of transistor 126 is run through resistive dividers 127 and 128 to control output driver transistor 130 which drives load resistance 129. Since the driver transistor 130 is connected to a source of 44 volts dc positive potential, the output 131 from this control circuit may be used to activate circuits requiring more than the nominal 12 volt positive potential available from the vehicle battery, such as the segment of the display 100 for the warning signal.

Figure 2:
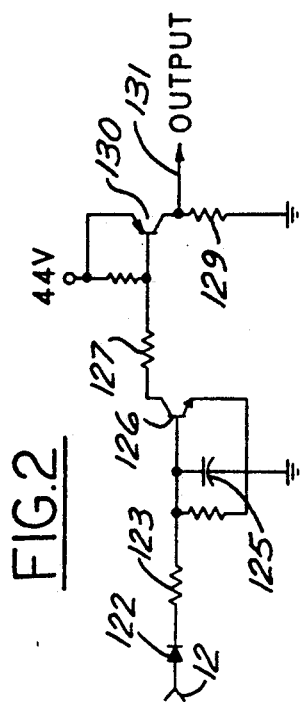
FIG. 2 is a schematic diagram of an input warning signal circuit.
Figure 4:
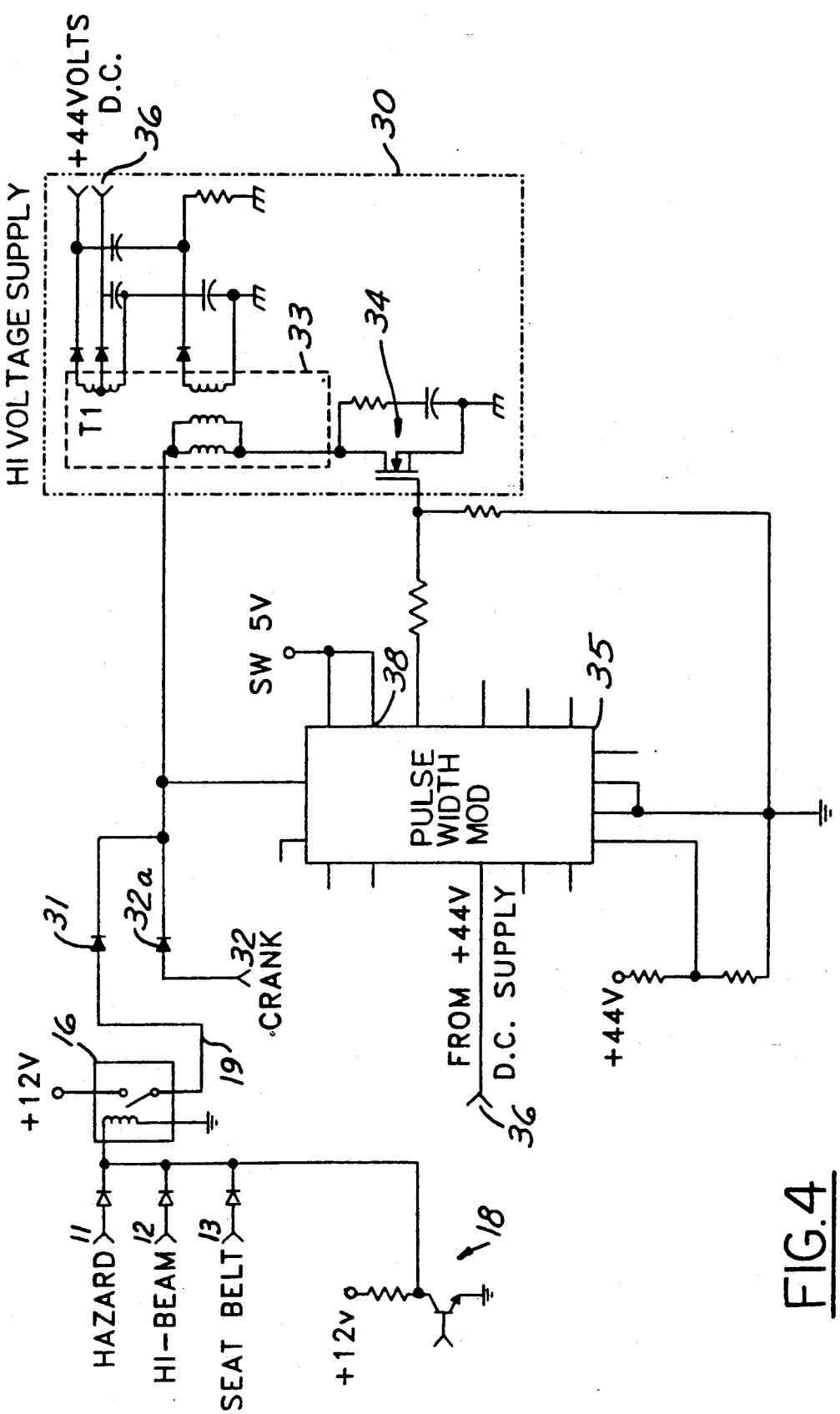
FIG. 4 is a schematic diagram of the hazard signals and how they interconnect with the switching power supply for the master driver display system for the vehicle.

The warning active detector, designated as 10 in FIG. 1, is also illustrated in more detail in FIG. 4. Each warning input 11, 12, 13, etc. is coupled to a corresponding sensor for that warning function and then coupled through a series diode 11A, 12A, 13A, etc. to the input of energizing coils for a relay 16. When the typical 12 volt positive warning signal appears at any of the inputs 11, 12, 13, this signal is applied across the relay coil, thus connecting a source of 12 volt power to an output 19 of the relay 16. In the event that one of the input warning signals is designed to be either zero or a negative potential, the conversion circuit shown generally as 18 is used to convert the input signal to a positive voltage sufficient to activate the input coil of relay 16.

The output 19 from the relay 16 is coupled through a series diode 31 in order to supply a source of electrical power to the high voltage switching power supply, shown generally as 30 in FIG. 4. This secondary input of 12 volt power is required because the normal 12 volt power input (or crank input) at 32 is not energized because the ignition switch has been presumed to be in the off position.

The 12 volt input is coupled to the high side of the primary windings of a transformer/rectifier 33. The low side of the primary windings is switched by FET 34, which in turn is controlled by oscillator 35. The outputs from transformer 33 include the normal full wave rectifier and capacitive filter circuitry that provide a well regulated 44 volt output at terminal 36. The voltage at the output terminal 36 is fed back as an input signal to oscillator 35, which functions as a pulse width modulator in order to keep the rectified output at terminal 36 at 44 volts. The 44 volt dc output at terminal 36 is used in several applications, primarily to power the master driver information display 100 through the display drivers 200, but also to be coupled to the driver transistor 130 as shown in FIG. 2. In order for the oscillator 35 to be turned on, a 5 volt signal must be supplied at pin 38. This 5 volt signal may be generated as follows.

Figure 3:
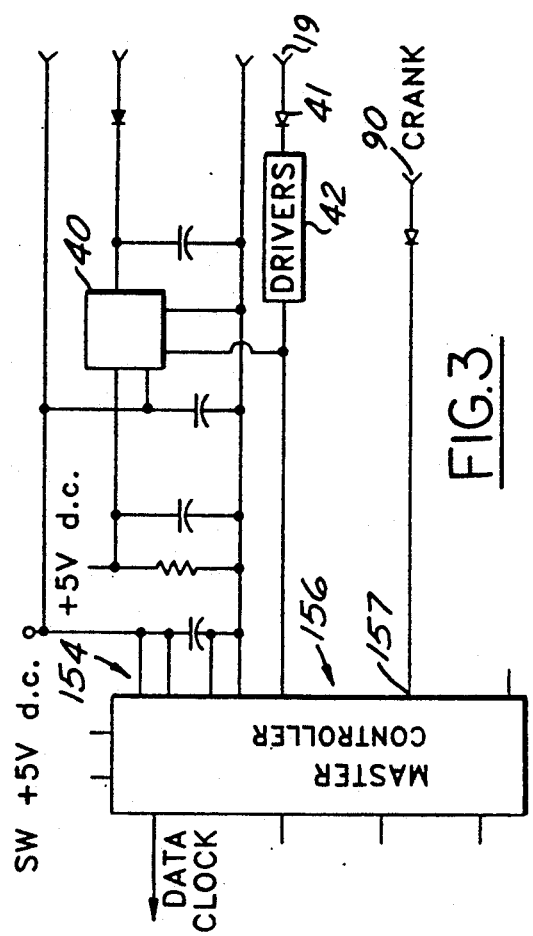
FIG. 3 is a schematic diagram of the present invention as it interfaces with the master display microcontroller.

With reference to FIG. 3, the output 19 from the warning active detector 10 is coupled through a series diode 41 and into a plurality of driver transistors, shown generally as 42, in order to activate an input 43 of the low voltage linear supply 40. One output 44 of the low voltage linear supply 40 comprises a regulated positive 5 volts, and a second output 45 comprises a switched 5 volts. This switched 5 volt output 45 is coupled back to pin 38 of the oscillator 35 and also into pin 154 of the 68HC11 master microcontroller for the master driver information display. The output 44 from the low voltage linear supply 40 is unswitched for use in powering the memory in the microcontroller 150.

When the microcontroller 150 senses the switched 5 volt supply voltage at pin 154, the microcontroller will turn on. Before the microcontroller 150 starts its initializing process, it must also receive a 12 volt signal at the output of the driver transistors 42 (which is driven by the active warning detector 19) and a 12 volt signal from the crank input 90 (which is connected to the master ignition switch—not shown). However, because the ignition switch is presumed to be in the off position, the crank signal 90 will not be at 12 volts. The microcontroller 150 will interpret this low crank signal 90 as an instruction to power up and initialize, but not to energize the display drivers 200 for the operational display elements. By not fully powering up the microprocessor 150 and the display drivers 200, the display system will continue to operate in a low power mode which is more consistent with long term standby operation.

Figure 5:
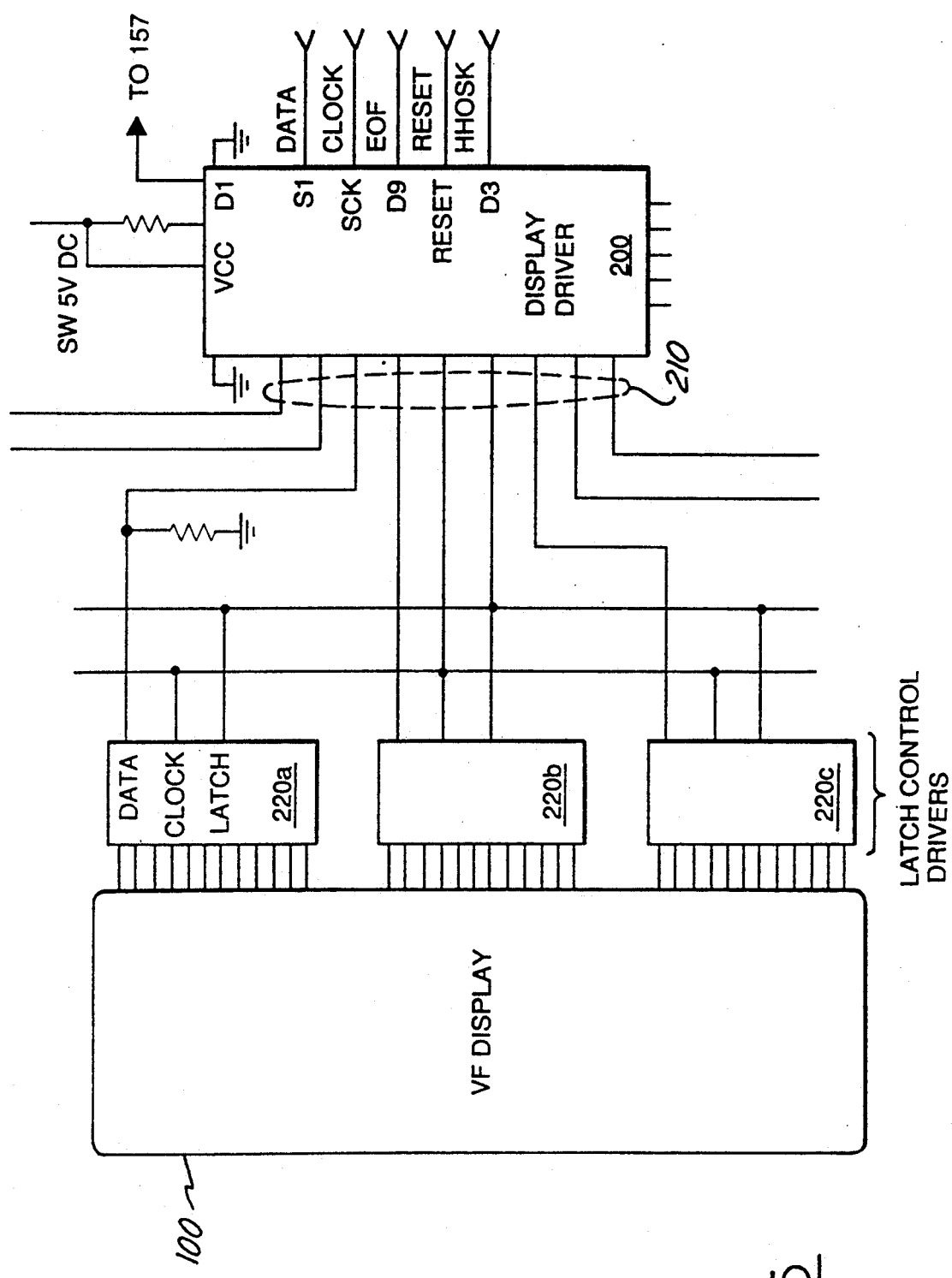
FIG. 5 is a schematic block diagram of typical display drivers and elements used in the master driver display system.

Another output 157 from the microcontroller 150 comprises data and clock signals which are coupled to the display drivers 200, as illustrated in FIG. 5. When the ignition switch is turned on, the microcontroller 150 will instruct the display drivers 200 to fully energize and control the entire instrumentation cluster. However, under conditions when the ignition switch is in the off position only the warning inputs will be controlled and energized. In essence, the microcontroller 150 instructs the display drivers 200 to blank out or suppress the portions of the instrumentation display that normally display operational characteristics of the vehicle, while enabling the display of the warning signals.

It should be noted that if the ignition switch is turned from the on to the off position, any energized hazard or warning input signals will be interpreted by the microcontroller 150 as instructions to suppress the normal operating display portions of the driver information display while enabling the required warning display elements.

Referring now to FIG. 5, the multiple outputs 210 from the display driver 200 are coupled to latch drivers 220A, 220B, 220C, etc., which in turn are coupled to appropriate pins on the VF tube display 100 for supplying the 44 volt dc power to the anode of the specific display element to be energized.

Figure 6:
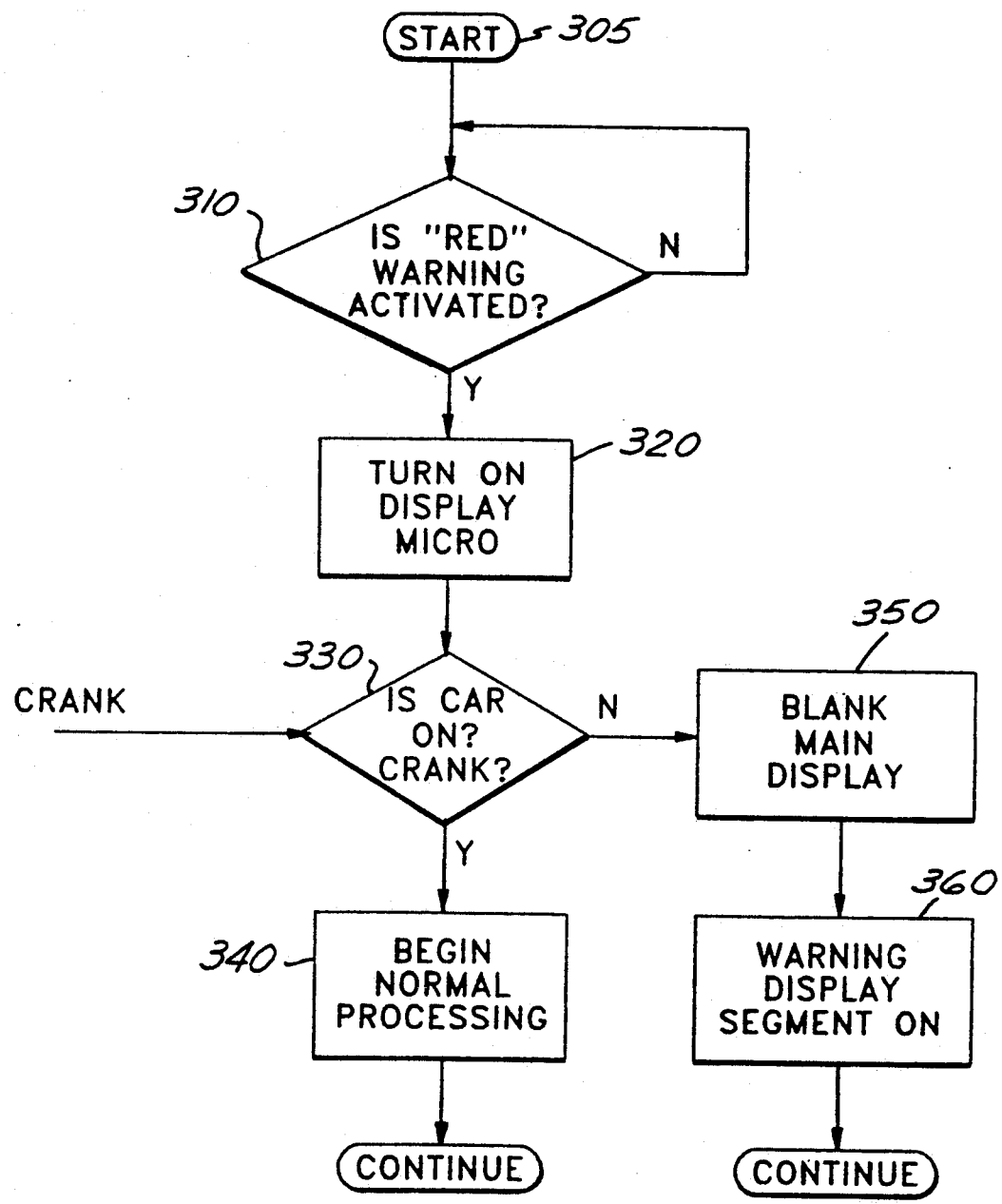
FIG. 6 is a simplified flowchart for software that is used to drive the display microcontroller.

With reference to FIG. 6, a software flow diagram for the operation of the multiple input warning system and the display microcontroller 150 are illustrated. When the master ignition switch is in the off position, only residual 12 volt power is supplied to the memory of the microprocessor 150 for retaining data therein. As soon as the "Red" or warning signal is supplied from the warning active detector 10 (step 310), the low voltage linear power supply 40 is enabled, thereby supplying the switched 5 volt dc signals for activating both the high voltage switching power supply 30 and the microcontroller 150 (step 320) Upon sensing an activated warning input signal, the microcontroller 150 immediately activates (at step 320) the portions of the display microcontroller 15 and driver 200 that are required to enable and supply power to the appropriate segments of the master driver information display 100.

At step 330, if the microcontroller 150 senses the presence of a crank signal at input 90, then the microcontroller 150 will begin normal processing for the entire master driver information display 100, thereby activating all portions of the display as shown in step 340. On the other hand, if the crank signal is not detected at step 330, the microcontroller 150 blanks or disables the sections of the display 100 not relating to the warning display segments Therefore, as defined by step 350, the only sections of the display 100 that will be illuminated are those for which warning inputs are detected. At step 360 the microcontroller 150 supplies signals allowing the 44 volt dc power from the high voltage switching power supply 30 to activate the display drivers 200 for the sensed warning signals It will be apparent to one skilled in the art that the software routine will continue to recycle to block 330 if the ignition switch is disabled or turned to the off position after the vehicle as been running. In this manner the appropriate segments of the display 100 will be enabled and the operational segments of the display 100 will be blanked.

While specific embodiments of the invention have been shown and described in detail to illustrate the application of the principles of the invention, it will be understood that the invention may be embodied in other forms and embodiments without departing from such principles.

I claim:

1. A monitoring and display system for a motor vehicle having a power source and a plurality of operational sensors and warning sensors, comprising:
   master controller means coupled to the operational sensors and the warning sensors for generating
      first control signals indicative of the status of the operational sensors, and
      second control signals indicative of the status of the warning sensors;
   master display means, coupled to said master controller means, and including
      operational display means for displaying operational indications responsive to said first control signals, and
      warning display means for displaying warning indications responsive to said second control signals;
   master switch means coupled between the power source and said master display means and said master control means for supplying power thereto when in an on condition but not in an off condition, and
   warning controller means, coupled to the warning sensors and said master controller means, and being operative only when said master switch means is in said off condition, including means for activating said master display means and said master control means responsive to receiving at least one of said warning signals, and means for disabling said first control signals and said operational display means responsive to receiving said warning signals, whereby said warning display means but not said operational display means may be activating by said warning signals when said master switch means is in said off condition.

2. The monitoring and display system described in claim 1 wherein said master display means comprises a single display device for displaying both said operational indications and said warning indications.

3. The monitoring and display system described in claim 2 wherein said master display means comprises a single display tube 4. The monitoring and display system described in claim 2 wherein said master controller means comprises a single microprocessor system for controlling said master display means.

5. The monitoring and display system described in claim 2 wherein said master switch comprises a master ignition switch for the motor vehicle 6. The monitoring and display system described in claim 2 wherein the warning sensors and said master controller means for generating said second control signals include at least three of the following:

means for sensing actuation of a hazard warning indicators for the vehicle, means for sensing actuation of a high beam headlight system for the vehicle, means for sensing unfastened seat belts for occupied seats within the vehicle, means for sensing an unlatched door on the vehicle, means for sensing actuation of a turn signal for the vehicle, and means for sensing actuation of brakes for the vehicle.

7. A monitoring and display system for a motor vehicle having a power source and a plurality of operational sensors and warning sensors for generating operational signals and warning signals, comprising:

a master display device having integral but separate displays for indicating the status of said operational and warning signals respectively, a master ignition switch coupled to the power source for actuating only said warning displays in said master display device when in an on condition but not in an off condition, and warning controller means, operative only when said master ignition switch is in said off condition, coupled to the power source, for actuating only the warning displays and deactivating the operational displays responsive to receiving one or more of the warning signals.

8. The monitoring and display system described in claim 7 wherein said master display device comprises a Vacuum Fluorescent display tube having separate illuminated anodes for indicating the status of the operational and warning signals.

9. The monitoring and display system described in claim 7 wherein said warning controller means includes operational means, coupled to said master ignition switch, for deactuating said warning controller means when said master ignition switch is in said on condition.

10. A method for actuating a master display system of the type having integral but separate visual displays for operational signals and warning signals that indicate the status of corresponding sensors in an automotive vehicle having a source of electrical power and an ignition switch, comprising the steps of:

supplying a source of electrical power to said master display system response to receiving at least one of said warning signals from said warning sensors, and sensing that the ignition switch of the vehicle is in the off position, activating a microprocessor based controller subsystem for receiving and processing said warning and operational signals, deactivating the visual displays of the master display system required for displaying said operational signals, and activating the portion of the master display system required for displaying said warning signals.

11. A monitoring and display system for a motor vehicle having a power source, comprising:

a plurality of operational sensors for sensing operating functions, a plurality of warning sensors for sensing warning functions, master controller means coupled to said operational sensors and to said warning sensors for generating first control signals indicative of the status of said operational sensors, and second control signals indicative of the status of said warning sensors;

a master display means, coupled to said master control means, and including operational display means for displaying operational indications responsive to said first control signals, and warning display means for displaying warning indications responsive to said second control signals, master switch means coupled to the power source and to said master display means and to said master control means for supplying power thereto when in an on condition but not in an off condition, and warning controller means, coupled to said warning sensors and said master controller means, and being operative only when said master switch means is in said off condition, including means for activating said master display means and said master control means responsive to receiving at least one of said warning signals, and means for disabling said first control signals and said operational display means responsive to receiving said warning signals, whereby said warning display means but not said operational display means may be activated by said warning signals when said master switch means is in said off condition.

12. The monitoring and display system described in claim 11 wherein said master switch comprises a master ignition switch for the motor vehicle.

13. The monitoring and display system described in claim 11 wherein said warning sensors include means for sensing actuation of the hazard warning signals for the vehicle.

14. The monitoring and display system described in claim 11 wherein said warning sensors include means for sensing actuation of the high beam headlight system for the vehicle.

15. The monitoring and display system described in claim 11 wherein said warning sensors include means for sensing unfastened seat belts for occupied seats within the vehicle.

16. The monitoring and display system described in claim 11 wherein said warning sensors include means for sensing an unlatched door for the vehicle.

17. The monitoring and display system described in claim 11 wherein said warning sensors include means for sensing actuation of a turn signal for the vehicle.

18. The monitoring and display system described in claim 11 wherein said warning sensors include means for sensing actuation of brakes for the vehicle.

19. The monitoring and display system described in claim 11 wherein said warning sensors include means for sensing actuation of turn signals for the vehicle.

* * * * *